G. J. BLEVINS.
ANIMAL TRAP.
APPLICATION FILED APR. 12, 1916.

1,305,054.

Patented May 27, 1919.
2 SHEETS—SHEET 1.

Inventor
G. J. Blevins.

G. J. BLEVINS.
ANIMAL TRAP.
APPLICATION FILED APR. 12, 1916.
1,305,054.
Patented May 27, 1919.
2 SHEETS—SHEET 2.
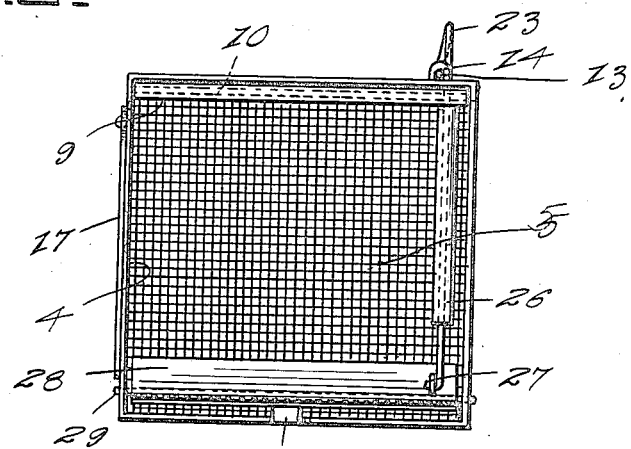
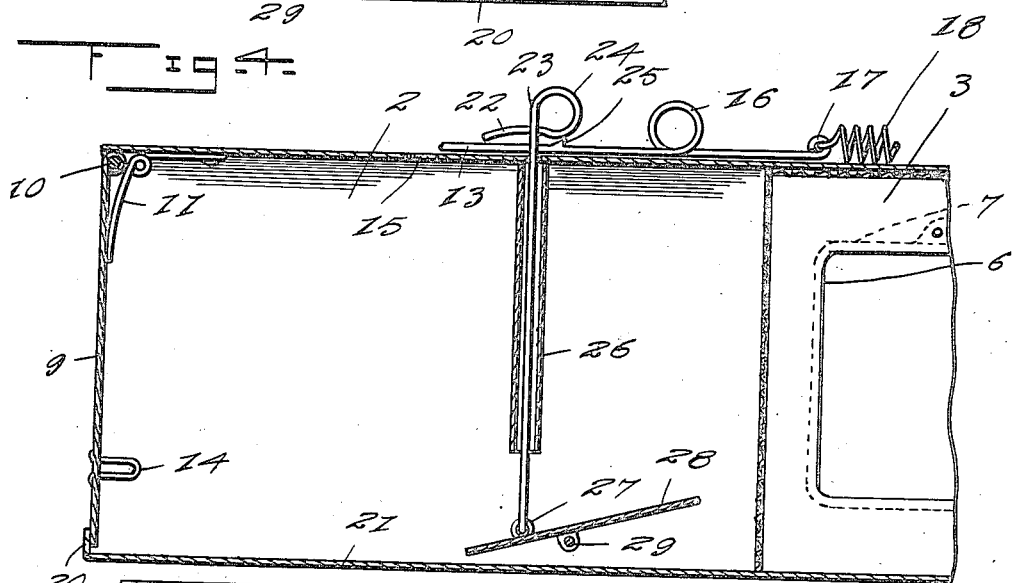

UNITED STATES PATENT OFFICE.

GENRAL J. BLEVINS, OF BREMEN, ALABAMA.

ANIMAL-TRAP.

1,305,054.   Specification of Letters Patent.   Patented May 27, 1919.

Application filed April 12, 1916. Serial No. 90,635.

*To all whom it may concern:*

Be it known that I, GENRAL J. BLEVINS, a citizen of the United States, residing at Bremen, in the county of Cullman and State of Alabama, have invented certain new and useful Improvements in Animal-Traps; and I do hereby declare the following to be a full, clear, and exact description of the invention, such as will enable others skilled in the art to which it appertains to make and use the same.

This invention relates to a trap, which is particularly designed for the purpose of catching or trapping fur bearing animals, and the primary object of the invention is to provide a trap, which is constructed so that live bait may be used in the trap, without endangering the lives of the bait and further to provide a trap which is operated by an animal endeavoring to reach the bait, for releasing a spring controlled door which will automatically swing into a closed position for preventing the escape of the animal from the trap.

Another object of this invention is to provide a trap structure as specified, wherein the spring controlled doors are normally held in an open or set position, by means of spring controlled rods, which rods are in turn held against movement by the action of the spring, by means of a catch, which catch is in turn connected to a pivoted tread so that when an animal treads upon the pivoted tread, it will release the spring controlled rod for permitting the doors to swing shut.

With the foregoing and other objects in view this invention consists in certain novel features of construction, combination and arrangement of parts as will be hereinafter more fully described, illustrated in the accompanying drawings and claimed.

In describing the invention in detail, reference will be had to the accompanying drawings, wherein like characters designate like and corresponding parts throughout the several views, and in which:—

Figure 1 is a top plan view of the improved trap,

Fig. 2 is a longitudinal section through the trap showing the doors when in open position, Fig. 3 is a vertical cross section through the trap, Fig. 4 is a fragmentary longitudinal section through the trap showing the doors in a closed position, and Fig. 5 is a fragmentary horizontal section through the trap.

Referring more particularly to the drawings, 1 designates a body or casing of the trap as an entirety, which is divided into three compartments 2, 3 and 4, by a pair of vertically positioned foraminous partitions 5. The compartments 2 and 4 are animal catching compartments, while the compartment 3 is a bait holding compartment. The bait is positioned within the compartment 3, through a door opening 6 formed therein which is normally closed by a door 7.

The construction of the compartments 2 and 4 is identical, and in describing the operation of the construction of the same, only one compartment will be referred to.

The outer end of the compartment 2 is open, as illustrated at 8, and a door 9 is provided which is hingedly connected as is shown at 10, to the top of the trap body. A spring 11 is provided and connected to the door 9 and the top 12 of the body 1 for automatically swinging the door 9 into a closed position, when the door is released from connection with a setting rod 13, which normally holds the door in an open position.

The bait, which may be live bait, such as chicken, rabbit or the like, depending upon the type of animal to be caught, is placed within the compartment 3, and the scent of the same will attract the animal to be caught. The animal will be permitted to pass inwardly through the opening 8, owing to the fact that the door 9 is held in open position as shown in Fig. 2 of the drawings, by the insertion of the outer end of the rod 13 in a staple 14 which is attached to the inner surface of the door 9. The staple 14 projects through an opening 15 formed in the top of the top 12 of the trap body or casing 1.

The rod 13 has a resilient convolution 16 formed therein intermediate of its ends, and its innermost end 17 is connected to a contractile spiral spring 18, which spring is in turn connected to the top 12 as shown at 19. The spring 18 is tensioned for moving the outer end of the rod 13 inwardly out of the staple 14 for releasing the door 9, which will allow the door to swing closed by the action of the spring 11. The outward or closing movement of the door is limited by a stop block 20 which is attached to the bottom 21 of the trap body 1.

The rod 13 is held in the staple 14 for holding the door 9 open, which holds the trap in a set position, by the end 22 of a releasing rod 23. The rod 23 is bent or coiled as shown at 24, so as to properly position the end 22 for engagement with the inner shoulder of an upstanding lug 25 which is formed upon the rod 13, and has a substantially vertical inwardly directed abutment surface. The rod 23 extends downwardly through the trap, and has a casing 26 surrounding the same. The lower end of the rod 23 is connected as shown at 27 to a pivotally mounted tread plate 28, this plate being mounted in casing 1 for rocking movement about a horizontal axis. The plate 28 is pivoted as shown at 29, so that when the animal enters the trap or the interior of the compartment 2, and endeavors to get the bait in the bait compartment 3, he must tread upon the plate 28, which will rock it so as to move the rod 23 upwardly, causing the end 22 thereof to move out of engagement with the lug 25, thus releasing the rod 13, which rod is pulled inwardly by the action of the contractile spiral spring 18, moving its outer end out of the staple 14, which allows the door 9 to swing into a closed position and close the animal within the compartment of the trap. As will be noted more clearly from Figs. 1 and 2 of the drawings, the setting rod 13 is slidable longitudinally of the body or casing of the trap, the downwardly and outwardly directed element 22 of releasing rod 23 being positioned in the path of movement of this setting rod. When the door 9 is raised and the setting rod 13 is moved outwardly so as to be inserted through the staple 14, the shoulder or lug 25 of this rod engages the element 22 of rod 23 so as to easily raise this rod, thus passing beneath the element 22 which then drops into locking position behind this lug thus holding the setting rod in operative position. This renders it possible to quickly and easily set the trap by the simple operation of swinging the door 9 inwardly and upwardly into substantially the position shown in Fig. 2 of the drawings, and then moving the setting rod into such position as to engage through the eye 14.

The construction used for catching an animal in the compartment 4 is identical with that previously described, as clearly shown by the drawings.

In Fig. 4 of the drawings, the trap door is shown in a closed position, and all of the various parts are in inoperative position, at which time it will be readily seen that the escape of the animal from either of the compartments of the trap is practically an impossibility.

What is claimed is:—

In a trap, a casing open at one end, a door hingedly secured to the top of said casing so as to be movable inwardly and upwardly thereof, means for positively limiting outward movement of said door when in lowered position, a staple carried by the door on the inner face thereof and adapted to project through the top of the casing when the door is in raised position, the top of said casing being provided with an opening to accommodate said staple, a setting rod slidably mounted on the top of the casing for movement longitudinally thereof and adapted to be inserted through the staple when in its outermost position so as to releasably hold the door in raised position, means for forcing said rod in a direction opposite to the open end of the casing so as to withdraw it from the staple, said setting rod being provided intermediate its ends with a lug having an inwardly directed substantially vertical abutment surface, a releasing rod slidably mounted for vertical movement and provided with an element disposed in the path of movement of said setting rod and adapted to engage the lug thereof when the setting rod is in operative position so as to hold said setting rod in such position, and a tread plate rockably mounted in the casing and connected to the lower end of the setting rod so as to permit raising thereof when the setting rod is moved into operative position so as to bring the lug thereof into engagement with the locking element of said tripping rod, the said plate acting to normally hold the tripping rod in depressed position so as to insure proper engagement of the locking element thereof in back of the lug of the setting rod.

In testimony whereof I affix my signature in presence of two witnesses.

GENRAL J. BLEVINS.

Witnesses:
LEE BLEVINS,
DAYTON RODEN.